United States Patent [19]

Schweizer

[11] 4,239,307
[45] Dec. 16, 1980

[54] STORAGE AND DEMONSTRATION DEVICE PARTICULARLY FOR CARD-TYPE DISPLAY OBJECTS

[76] Inventor: Eduard H. Schweizer, 5101 Boarsheed Rd., Minnetonka, Minn. 55343

[21] Appl. No.: 936,894

[22] Filed: Aug. 25, 1978

[30] Foreign Application Priority Data

Sep. 2, 1977 [CH] Switzerland .............. 10721/77

[51] Int. Cl.² .................................. A47B 63/00
[52] U.S. Cl. ................................ 312/183; 312/13; 211/50; 206/503
[58] Field of Search ............... 312/183, 188, 9, 10, 312/13, 8, 258, 284; 206/44 R, 503; 211/47, 50, 51

[56] References Cited

U.S. PATENT DOCUMENTS

| | | | |
|---|---|---|---|
| 968,253 | 8/1910 | Moses | 312/10 |
| 995,487 | 6/1911 | Scholl | 312/13 |
| 1,889,625 | 11/1932 | Barter | 206/44 R |
| 2,140,382 | 12/1938 | Hotson | 211/47 |
| 2,459,385 | 1/1949 | Martin | 211/51 |
| 2,665,808 | 1/1954 | McAlister | 312/183 |
| 2,684,766 | 7/1954 | Blom | 206/503 |
| 3,291,545 | 12/1966 | Bennett | 312/183 |
| 3,817,393 | 6/1974 | Neilsen | 312/183 |
| 4,012,087 | 3/1977 | Edwards, Jr. | 312/183 |
| 4,084,699 | 4/1978 | Koepke | 211/51 |

*Primary Examiner*—Victor N. Sakran
*Attorney, Agent, or Firm*—Cushman, Darby & Cushman

[57] ABSTRACT

Storage and demonstration device for polygonal or round flat objects, for example card-shaped display objects, in the kind of a container. The device comprises a stand and a multi-segmented cover which is formed by a number of consecutively arranged segments. The segments are turnably supported in the stand in such a manner that they can be tilted towards the front and rear of the stand. The segments enclose compartments which are closed when the segments occupy the position towards the rear.

3 Claims, 5 Drawing Figures

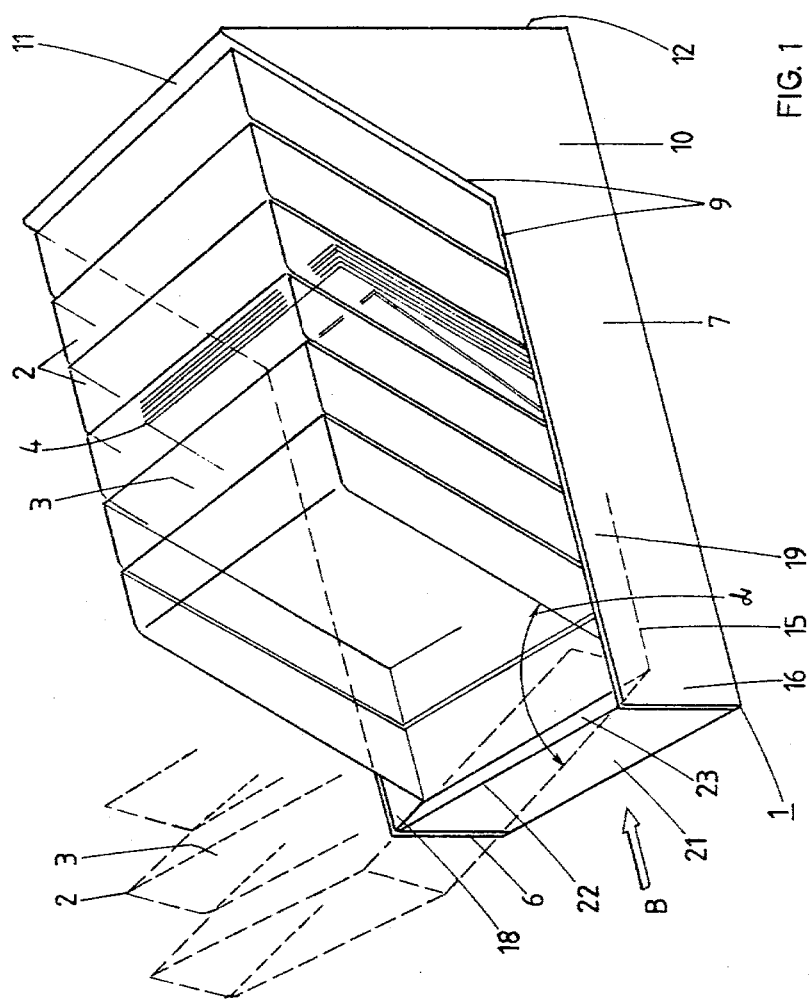

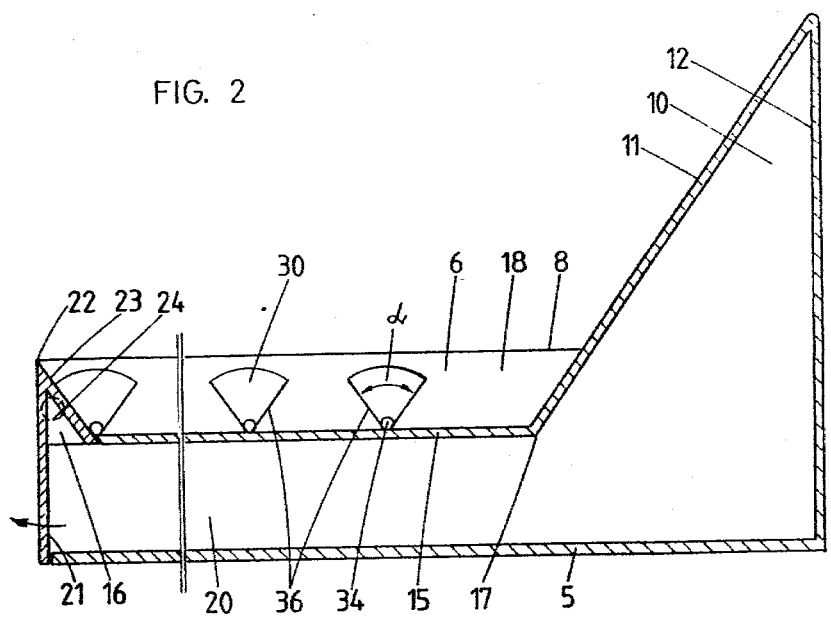
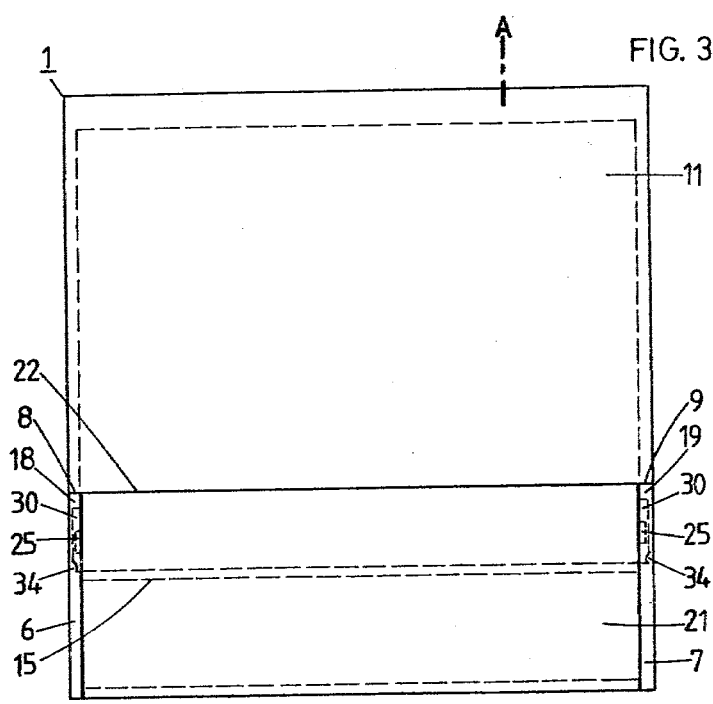

STORAGE AND DEMONSTRATION DEVICE PARTICULARLY FOR CARD-TYPE DISPLAY OBJECTS

The invention relates to a storage and demonstration device for polygonal or round flat objects, for example card-shaped display objects, photographs, slide envelopes, film reels, tape cassettes.

Card-shaped storage and demonstration objects such as photographs or stamps on envelopes are generally stored in albums. However, in relation to the collected object, albums are relatively heavy and voluminous and therefore inconvenient to handle. A further disadvantage of albums is their relatively low capacity in relation to their cost. Additionally, objects once filed are inconvenient to rearrange.

Among other products, the business supplies industry has produced card files with cards vertically positioned in suitable trays. However, the field of vision when leafing through cards filed in this manner is highly restricted so that a card must be completely removed if the user is to derive all information therefrom. Furthermore, card files are of little appeal for any purposes other than office filing so that further use of the card file principle was not deemed expedient.

The object of the invention was to exploit the card file principle to obtain a storage and demonstration device for flat, polygonal, round or card-shaped objects and/or display objects which would eliminate the disadvantages of albums.

In particular, the invention was to fulfill the following requirements: the stored objects were to be protected against environmental influences such as dust, convenient viewing of the individual removal from the device; removability of objects and convenient rearrangement as well as an appopriate price/benefit ratio. A further important criterion for such a device to be classified in the field of entertainment products and to appeal to a larger circle of viewers was smart styling and representative appearance.

These objectives are attached with the device of the present invention which is characterized by an oblique-angled rectangular closed container with a segmented cover and a stand, said stand having a base section, a pair of parallel side panels and a front and rear section with support elements, which cover is formed by a number of segments consecutively arranged at specific intervals between the front and rear section and retained in the stand in such a manner that they can be tilted from a position oriented towards the rear section to a position oriented towards the front section and vice versa, which segments enclose compartments for the objects, said compartments being closed when the segments occupy the position oriented towards the rear section.

If all segments elements are oriented towards the rear section, the content of the compartments is sealed off against the environment by the cover formed by the dividers. A particular advantage is the fact that the segments are shaped as hoods open towards the rear and consist of transparent flat panels. Shaped in this manner, the consecutively arranged hoods oriented towards the rear section of the stand provide the appealing impression of a single, closed, flat, and transparent cover hood for the stand. On the other hand, the tilting angle of the hoods is expediently selected in such a manner that the stored contents can be effortlessly viewed when tilting the individual hoods.

This and further features of the invention shall be elucidated by typical examples on the basis of the following drawings in which:

FIG. 1 is a prospective view of a device of simplified representation;

FIG. 2 is a sectional view taken on line A—A of FIG. 3 through the stand of the device according to FIG. 1;

FIG. 3 is a front view of the stand in FIG. 2;

Figure 4:
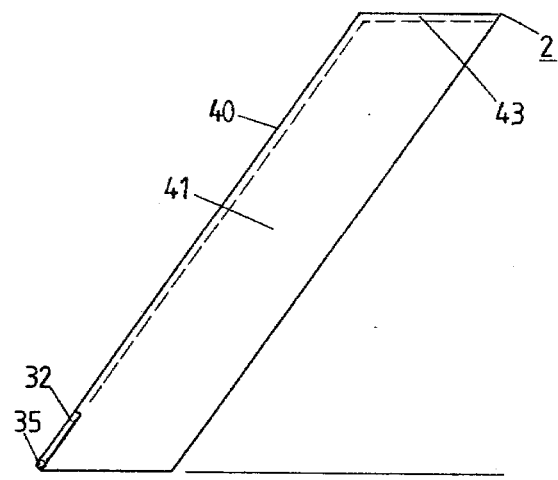
FIGS. 4 and 5 are a side and top view, respectively, on a segment of the device according to FIG. 1.

In reference to FIG. 1, the device substantially consists of the stand 1 and of a number of segments 2 turnably supported on the stand 2 which can be tilted around a tilt angle $\alpha$ from a position inclined towards the rear into a position inclined towards the front and indicated with dashed lines. The overall impression of the device when the segments 2 are tilted towards the rear is that of a fully enclosed box-type container whose cover is segmented. The segments 2 possess the form of hoods open towards the rear whose interior form compartments 3 which accommodate display objects 4. The segments 2 are preferably made of transparent stable material while stand 1 is opaque and to achieve a contrast effect could be typically surfaced in a glossy black finish.

In reference to FIGS. 1 to 3, stand 1 contains in direction of visions B a longitudinal, rectangular and closed base 5 and two vertical side panels 6,7. The upper edges 8,9 of the side panels 6,7 extend horizontally to the stand back section 10 and from there upwards in an angle to the rear. A flat inclined panel 11 is located between the inclined sections of upper edges 8,9; the inclination measured against the vertical line corresponds to half the tilting angle $\frac{1}{2}\alpha$ of the segments 2. At the rear, display stand 1 is closed by back panel 12.

Stand 1 furthermore includes a horizontal base plane 15 at a specific distance from base 5 recessed between side panels 6,7. The base plane 15 extends from the stand front section 16 to the intersection 17 with inclined panel 11 which merges with base plane 15 beyond the angle point of upper edges 8,9. Base plane 15 forms the floor for the objects resting on it in upright position. The recessed position of base plane 15 creates protruding upper sections 18,19 of side panels 6,7 in which the segments are retained in tilting bearings.

The space between base 5 and base plane 15 represents an extra storage compartment 20. Such a storage compartment 20 is often desirable to accommodate objects not generally displayed, such as negatives. The storage compartment 20 is accessible through stand front section 16 which is designed as a flat. The stand front section 16 consists of a head panel 21, which is located in the opening between base 5 and side panels 6,7 and completely closes this opening. Furthermore, upper edge 22 of head panel 21 merges into an inclined panel 23 inclined at an angle of $\frac{1}{2}\alpha$ towards the inside of the stand, extending to the commencement of base plane 15. Below upper edge 22, the device features a protruding stub 24 on both sides where head panel 21 meets inclined panel 23. These stubs 24 are indicated in FIG. 2. Stubs 24 rest in correspondingly shaped recesses 25 of side panel 6,7 (see FIG. 3) so that the assembly consisting of head panel 21 and inclined panel 23 will swing out as an entity around angle point 24/25 in the direction of the arrow, thus providing access to the storage compartment 20.

The internal sides of the upper sections 18,19 of side walls 6,7 have opposing bearings which match those of segments 2. The bearings consist of recessed circular sectors 30 in upper sections 18,19, with apertures corresponding to tilting angle α. Furthermore, the circular sectors 30 are arranged symmetrically in reference to the vertical line through the point which in turn lies in base plane 15. The segments 2 are retained in circular sectors 30 according to FIGS. 4,5 with the strips 31, 32 whose outer sides are shaped such as to engage with circular sectors 30. When tilting a segments 2, strips 31,32 sweep across the entire sector area, whereby an unintentional disengagement of strips 31,32 from circular sectors 30 is prevented by a tab 34 located at the point of the sector, see FIG. 3, which engages with a corresponding groove 35 in strips 31,32. This holding mechanism provides a stable guidance during the tilting motion of the segments 2. The inclination angle of the front and rear positions of segments 2 is limited by the stops formed by legs 36 of circular sectors 30. Legs 36 also absorb the pressure exerted by the contents of compartments 3 on segments 2.

Figure 5:
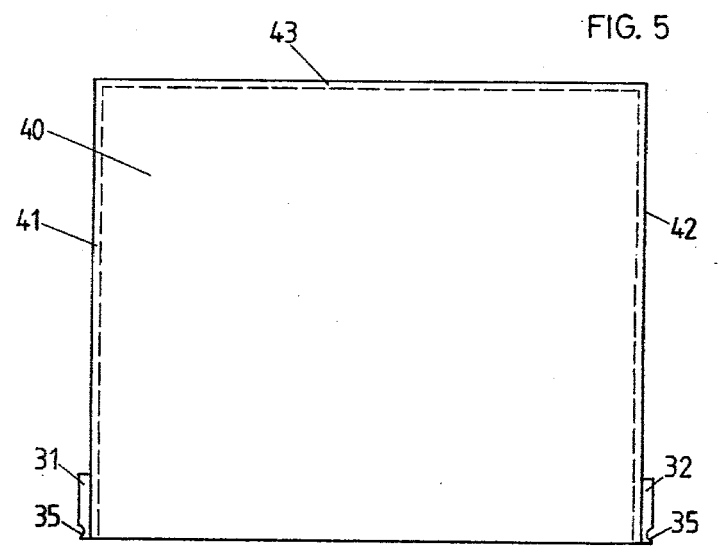

According to FIGS. 4 and 5, the hood-shaped segments 2 are items composed of separator wall 40 with side wall section 41, 42 and top panel 43, all facing towards the rear. The segments 2 are shaped as acute-angle parallel epipeds facing towards the rear. The obtuse angle between separator 40 and top panel 43 is preferably $90° + α/2$, so that top panel 43 is horizontal, i.e. parallel to the base. Furthermore, this results in a support of segments 2 with base edges 44 of side wall sections 41,42 on base plane 15 when segments 2 are oriented towards the rear. The length of base edge 44, i.e. the length of the segment in the longitudinal direction is expediently chosen to be identical to the interval between the tips of two adjacent circuit sectors 30.

If these dimensions are observed, the segments 2 supported in circular sectors 30 will merge in the positions in which they are oriented towards the rear and will close compartments 3. The consecutively arranged segments 2 will provide the advantageous impression of one signle cover hood with a horizontal cover panel. In conjunction with display stand 1, a uniform container results commensurate with the purpose. The tilt angle α is expediently chosen in the range between 50° and 60° and the dimensions of segments 2 are purposefully chosen to comply with the format of conventional display objects such as photographs. In the same manner, the device can also be used to display slides in envelopes, etc.

Apart from storage purposes, a further field of applications for the device is the display of objects at auctions, for example. The term display objects according to the invention encompasses all flat objects which apart from photographs may include stamp cards, envelopes, coin cards, etc.

Other flat objects which can be stored and displayed are film reels for amateur filmers or tape cassettes. If desired, the device can also be used as a card file or as an archive box.

It is understood that the scope of invention is not restricted to the above embodiment. Although the device does not require a separate cover because the stored objects are protected against dust, an additional cover may be provided for certain purposes such as for shipment. The base compartment 20 of the device can be equipped with a removable drawer or the base compartment 20 can be eliminated so that a double base is no longer necessary. The side panels 6,7 of the display stand can be higher, thus eliminating the side panels 41,42 of segments 2. A modular design is also conceivable which would allow arbitrary expansion of the number of compartments such as by intermediate connection of stand parts or consecutive arrangements of several stands 1 by means of groove tailed joints.

I claim:

1. Storage and demonstration device for flat card-shaped display objects, comprising:
    an oblique-angled rectangular closed container having a multiple segmented cover and a stand, said stand having a base section, a pair of parallel side panels, a front section and a rear section, each of said front and rear sections being provided with inclined support elements,
    said cover being formed by a number of segments consecutively arranged at specific intervals between said front and rear sections and retained in said stand in such a manner that they can be tilted from a position oriented towards said rear section to a position oriented towards said front section and vice versa, said segments defining compartments for the objects, said compartments being closed when said segments occupy the position oriented towards said rear section,
    said segments being shaped as hoods open on the sides facing said rear section, having flat side and top wall sections extending towards said rear section and forming said closed cover when said segments are in the positions oriented towards said rear section.

2. Device according to claim 1 wherein said wall sections form a top cover panel extending parallel to said stand base section and side panels extending parallel to said stand side panels when the segments occupy the positions oriented towards the rear section.

3. Device according to claim 1 or 2 wherein said segments comprise rectangular separator walls with said wall sections extending therefrom, the base section has a base plane for supporting the objects and bearings formed above said base plane at opposing locations in the stand side panels at identical intervals which accommodate the segments, said bearings being circular sectors recessed in said stand side panels and having an aperture corresponding to the tilt angle, whereby the apex of said circular sectors is located at said base plane, and wherein said segments have lateral strips projecting from the sides of said separator walls and having a length corresponding to the radius of said circular sectors, said segments being supported in said circular sectors by means of said strips whereby the sides of said circular sectors form stops for the tilting movement of said segments.

* * * * *